US011169855B2

(12) United States Patent
Gauthier

(10) Patent No.: US 11,169,855 B2
(45) Date of Patent: Nov. 9, 2021

(54) RESOURCE ALLOCATION USING APPLICATION-GENERATED NOTIFICATIONS

(71) Applicant: SAP SE, Walldorf (DE)

(72) Inventor: Alain Gauthier, Montreal (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/701,800

(22) Filed: Dec. 3, 2019

(65) Prior Publication Data

US 2021/0165689 A1    Jun. 3, 2021

(51) Int. Cl.
*G06F 9/46* (2006.01)
*G06F 9/50* (2006.01)
*H04L 29/08* (2006.01)

(52) U.S. Cl.
CPC ............ *G06F 9/505* (2013.01); *G06F 9/5033* (2013.01); *G06F 9/5088* (2013.01); *H04L 67/1008* (2013.01); *G06F 2209/5018* (2013.01)

(58) Field of Classification Search
CPC ...... G06F 9/505; G06F 9/5033; G06F 9/5088; G06F 2209/5018; H04L 67/1008
See application file for complete search history.

(56) References Cited

U.S. PATENT DOCUMENTS

| 5,325,292 | A | * | 6/1994 | Crockett | G06Q 10/06 |
| | | | | | 705/7.18 |
| 5,835,765 | A | * | 11/1998 | Matsumoto | G06F 9/4843 |
| | | | | | 718/102 |
| 6,772,131 | B1 | * | 8/2004 | Francis | G06Q 10/10 |
| | | | | | 705/35 |
| 6,907,531 | B1 | * | 6/2005 | Dodd | G06F 21/577 |
| | | | | | 709/224 |
| 7,107,591 | B1 | * | 9/2006 | Karp | G06F 9/465 |
| | | | | | 718/100 |
| 8,924,974 | B1 | * | 12/2014 | Ruggiero | G06F 9/4843 |
| | | | | | 718/101 |
| 9,479,567 | B1 | * | 10/2016 | Koorapati | G06F 16/27 |
| 10,268,514 | B1 | * | 4/2019 | Kesarwani | G06F 9/5011 |
| 2002/0010794 | A1 | * | 1/2002 | Stanbach, Jr. | H04L 29/12066 |
| | | | | | 709/245 |
| 2002/0073134 | A1 | * | 6/2002 | Barnett | G06F 9/505 |
| | | | | | 718/105 |

(Continued)

OTHER PUBLICATIONS

Kubernetes, "Working with Kubernetes Objects," downloaded from https://kubernetes.io/docs/concepts/overview/working-with-objects/namespaces/ on Jun. 1, 2021, 22 pps.

*Primary Examiner* — Adam Lee
(74) *Attorney, Agent, or Firm* — Klarquist Sparkman, LLP

(57) ABSTRACT

Systems, methods, and computer program products are described herein for proactively allocating resources of a computing infrastructure having a plurality of namespaces. Data having process information for executing an application task on a namespace of the computing infrastructure is received. The process information defines process loads associated with the application task. A number of application servers for executing the application task are determined based on the process loads. Application servers are allocated to the namespace based on the determined number of application servers for execution of the application task. The receiving, the determining, and the allocating occur prior to execution of the application task.

12 Claims, 9 Drawing Sheets

(56) References Cited

U.S. PATENT DOCUMENTS

| | | | |
|---|---|---|---|
| 2002/0152322 A1* | 10/2002 | Hay | H04L 67/1034 709/245 |
| 2003/0005157 A1* | 1/2003 | Chung | H04L 29/12594 709/245 |
| 2004/0022254 A1* | 2/2004 | Pathak | H04L 29/12047 370/396 |
| 2005/0114862 A1* | 5/2005 | Bisdikian | G06F 9/5072 718/105 |
| 2005/0278453 A1* | 12/2005 | Cherkasova | H04L 67/322 709/231 |
| 2007/0282939 A1* | 12/2007 | Ohno | G06F 9/52 709/201 |
| 2010/0106691 A1* | 4/2010 | Preslan | G06F 11/1464 707/674 |
| 2010/0174829 A1* | 7/2010 | Drako | H04L 51/28 709/245 |
| 2010/0191779 A1* | 7/2010 | Hinrichs | G06F 3/0689 707/822 |
| 2010/0281487 A1* | 11/2010 | Schneider | G06F 9/44526 718/104 |
| 2012/0060168 A1* | 3/2012 | Lee | G06F 9/45533 718/104 |
| 2013/0067024 A1* | 3/2013 | Vasters | G06F 9/542 709/217 |
| 2013/0179881 A1* | 7/2013 | Calder | G06F 9/5088 718/1 |
| 2013/0179894 A1* | 7/2013 | Calder | G06F 9/5027 718/104 |
| 2013/0179895 A1* | 7/2013 | Calder | G06F 9/5077 718/104 |
| 2013/0204991 A1* | 8/2013 | Skjolsvold | G06F 9/5083 709/223 |
| 2014/0026119 A1* | 1/2014 | Jana | G06F 9/505 717/124 |
| 2014/0068623 A1* | 3/2014 | Kanemasa | G06F 9/4881 718/103 |
| 2014/0082145 A1* | 3/2014 | Lacapra | H04L 61/1552 709/219 |
| 2014/0089459 A1* | 3/2014 | Werr | G06F 9/38 709/217 |
| 2014/0173623 A1* | 6/2014 | Chang | G06F 9/5094 718/105 |
| 2015/0180719 A1* | 6/2015 | Wu | H04L 47/726 709/224 |
| 2015/0187042 A1* | 7/2015 | Gupta | G06F 9/3851 345/501 |
| 2015/0288571 A1* | 10/2015 | Baughman | H04L 41/16 703/21 |
| 2016/0004564 A1* | 1/2016 | Park | G06F 9/4881 718/104 |
| 2016/0004569 A1* | 1/2016 | Kim | G06F 9/5027 718/104 |
| 2016/0321102 A1* | 11/2016 | Lee | G06F 9/5088 |
| 2016/0365975 A1* | 12/2016 | Smith | H04L 9/0833 |
| 2017/0024137 A1* | 1/2017 | Kanno | G06F 3/0644 |
| 2017/0046342 A1* | 2/2017 | Azgin | H04L 45/748 |
| 2017/0116597 A1* | 4/2017 | Bargagli | G06Q 20/326 |
| 2017/0220598 A1* | 8/2017 | Lu | H04L 67/10 |
| 2017/0242722 A1* | 8/2017 | Qiu | G06F 13/385 |
| 2017/0249469 A1* | 8/2017 | Goyal | G06F 9/455 |
| 2017/0250857 A1* | 8/2017 | McCullough | H04L 41/069 |
| 2018/0034913 A1* | 2/2018 | Matthieu | H04W 12/0609 |
| 2018/0109625 A1* | 4/2018 | Jayaraman | H04L 67/141 |
| 2018/0278679 A1* | 9/2018 | Sahin | G06F 9/5077 |
| 2018/0287951 A1* | 10/2018 | Waskiewicz, Jr. | H04L 67/1097 |
| 2019/0235779 A1* | 8/2019 | Li | G06F 3/0643 |
| 2020/0059448 A1* | 2/2020 | Cuciti | G06Q 50/01 |
| 2020/0099788 A1* | 3/2020 | de Abreu Resenes | H04M 3/5183 |
| 2020/0104056 A1* | 4/2020 | Benisty | G06F 12/0246 |

\* cited by examiner

RESOURCE ALLOCATION USING APPLICATION-GENERATED NOTIFICATIONS

TECHNICAL FIELD

The subject matter described herein relates to enhanced techniques for resource allocation.

BACKGROUND

In order to operate, computer applications consume computing resources such as memory or processing power. Resource allocation is the process of assigning and managing computational assets to particular applications so that each application can perform its tasks. With cloud computing infrastructures, computing resources are shared with a number of users and workload demands associated with applications operated by the users can vary. This is known as elastic computing. With elastic computing, the underlying architecture adapts (e.g., auto-scaling) its resources in a reactive manner. In other words, resources are adjusted in response or reaction to a detected high level of activities or resource consumption either after or while such consumption is occurring. Such reactive response induces a delay between the detection time and the deployment and availability of the additional resources to support the detected peak. This delay can in turn cause software applications and/or systems to slow down or even put them at risk of running out of memory and/or crashing. With this reactive approach, applications have no way to communicate specific system needs in advance to ensure computing resources are available.

SUMMARY

In some aspect, a method of proactively allocating resources of a computing infrastructure having a plurality of namespaces includes receiving data comprising process information for executing an application task on a namespace of the computing infrastructure. The process information defines process loads associated with the application task. A number of application servers for executing the application task are determined based on the process loads. Application servers are allocated to the namespace based on the determined number of application servers for execution of the application task. The receiving, the determining, and the allocating occur prior to execution of the application task.

In some variations, the namespace, can evaluate process threads associated with executing the application task. The process loads associated with executing the process threads can be determined by the namespace. The namespace can generate a notification comprising the process information defining the process loads. In other variations, the notification can be in a JavaScript Object Notation format.

In other variations, a system load can be monitored across the plurality of namespaces. The number of application servers allocated to the namespace can be based on the system load.

In some variations, the process information can include work processes defining a number of process threads capable of being executed in parallel, a type of work to be executed, a memory size associated with executing application processes, and a priority level associated with the application.

In other variations, the process loads of the plurality of namespaces can be determined based on current availability of application servers and additional processing tasks expected to be running when the application on each namespace is executed.

In some variations, the allocating can include at least one of (i) maintaining a current number of application servers within the namespace, (ii) adding one or more additional application servers to the namespace, or (iii) removing one or more additional application servers from the namespace.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a resource communications architecture that can proactively communicate with and support applications. With this architecture, applications layers can precisely communicate what a specific application or job is about to run, in terms of work processes, memory, size, length, and/or any other parameters relating to the underlying infrastructure. Use of this subject matter can minimize or avoid delay associated with reactive resource allocations such as the delays between a detected resource allocation issue and any remedial corrections to address such issue. This can in turn minimize or avoid the risk of application or system crashing associated with these delays. With the infrastructure described herein, resource allocations issues can be addressed before becoming an issue in the first place.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

In the context of some applications, there are large numbers of jobs, activities, and/or processes that can be planned in advance for execution. This opens up the possibility of determining, in advance, the needed resources to run these processes. In doing so, the architecture can operate in a proactive mode, scaling the resources before an application task has even has started. The subject matter presented herein provides a resource communication infrastructure that enables proactive notification from applications that are processing and/or planning to the underlying architecture. The applications are able to proactively inform the underlying infrastructure about the potential need of additional resources. This enables the infrastructure to adjust resource allocations accordingly having both a detailed and global overview of system needs.

Figure 1:
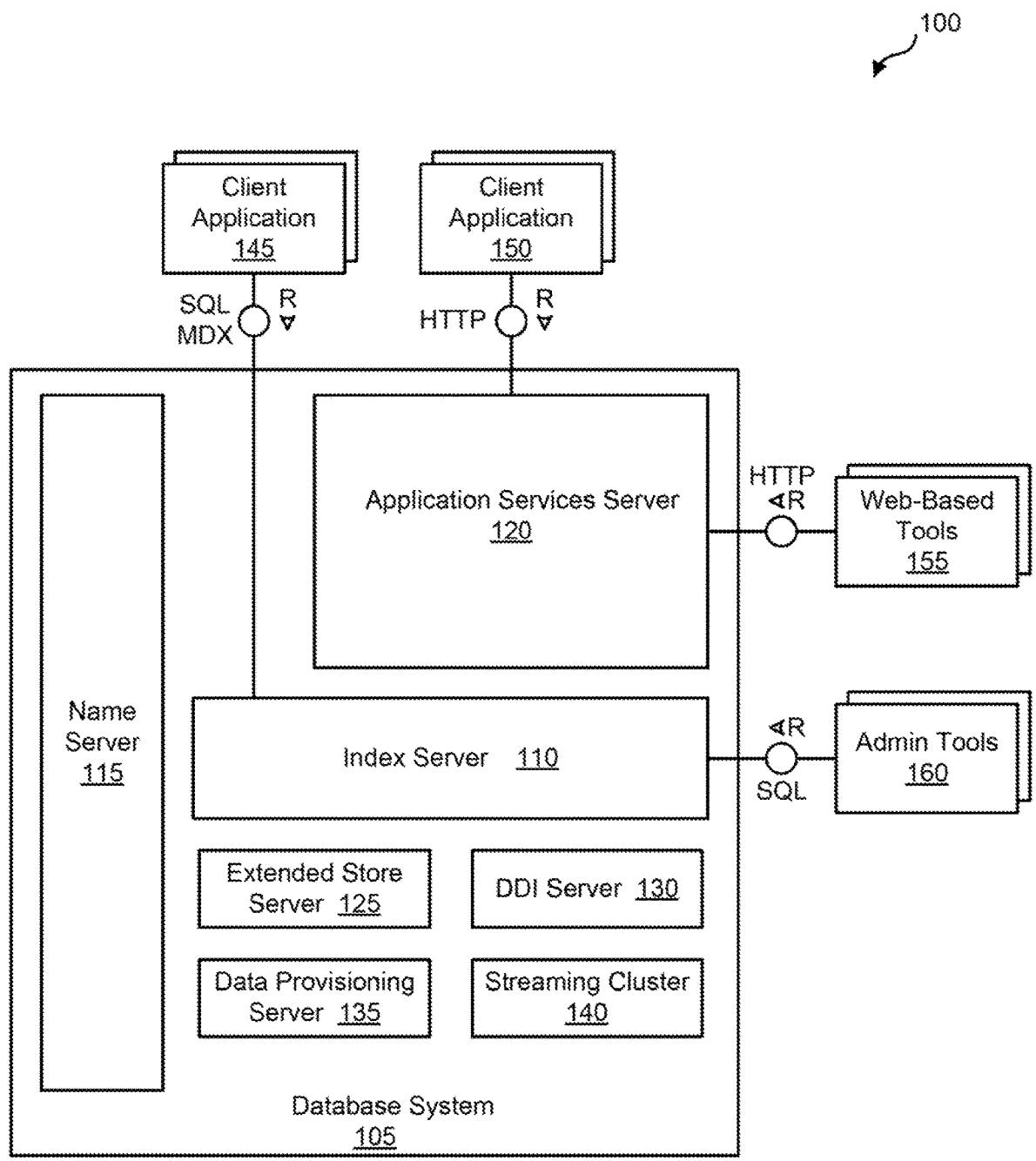
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as Hypertext Transfer Protocol (HTTP) (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management, and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
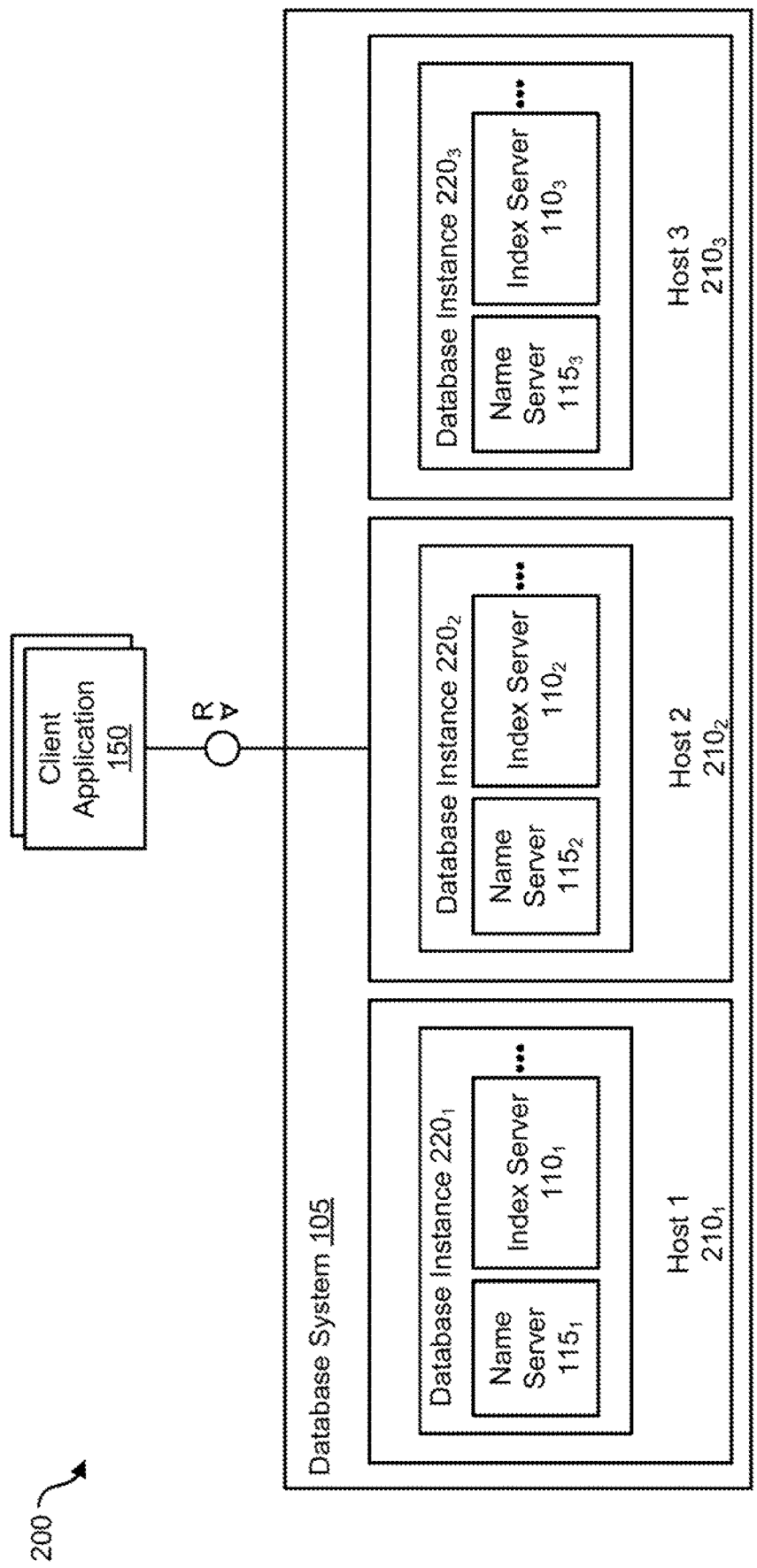
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
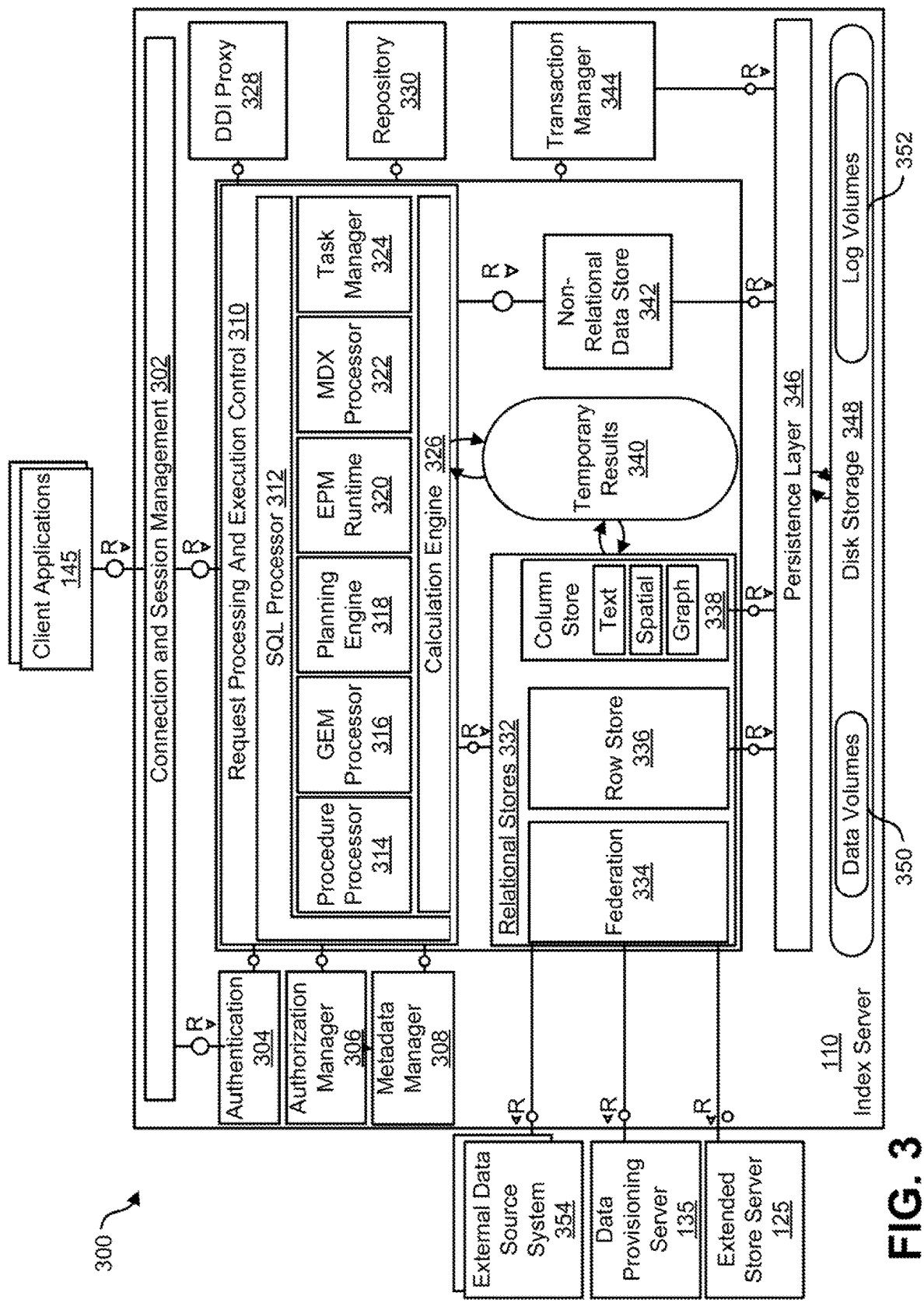
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead, it is built using the column store 338, which can have a dedicated graph Application Program Interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a transaction log. Recovery log entries can be written in the persistence layer 346 (in recovery log volumes 352) explicitly by using log interface or implicitly when using the virtual file abstracting. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g., free up space occupied by deleted data etc.).

The persistence layer 346 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
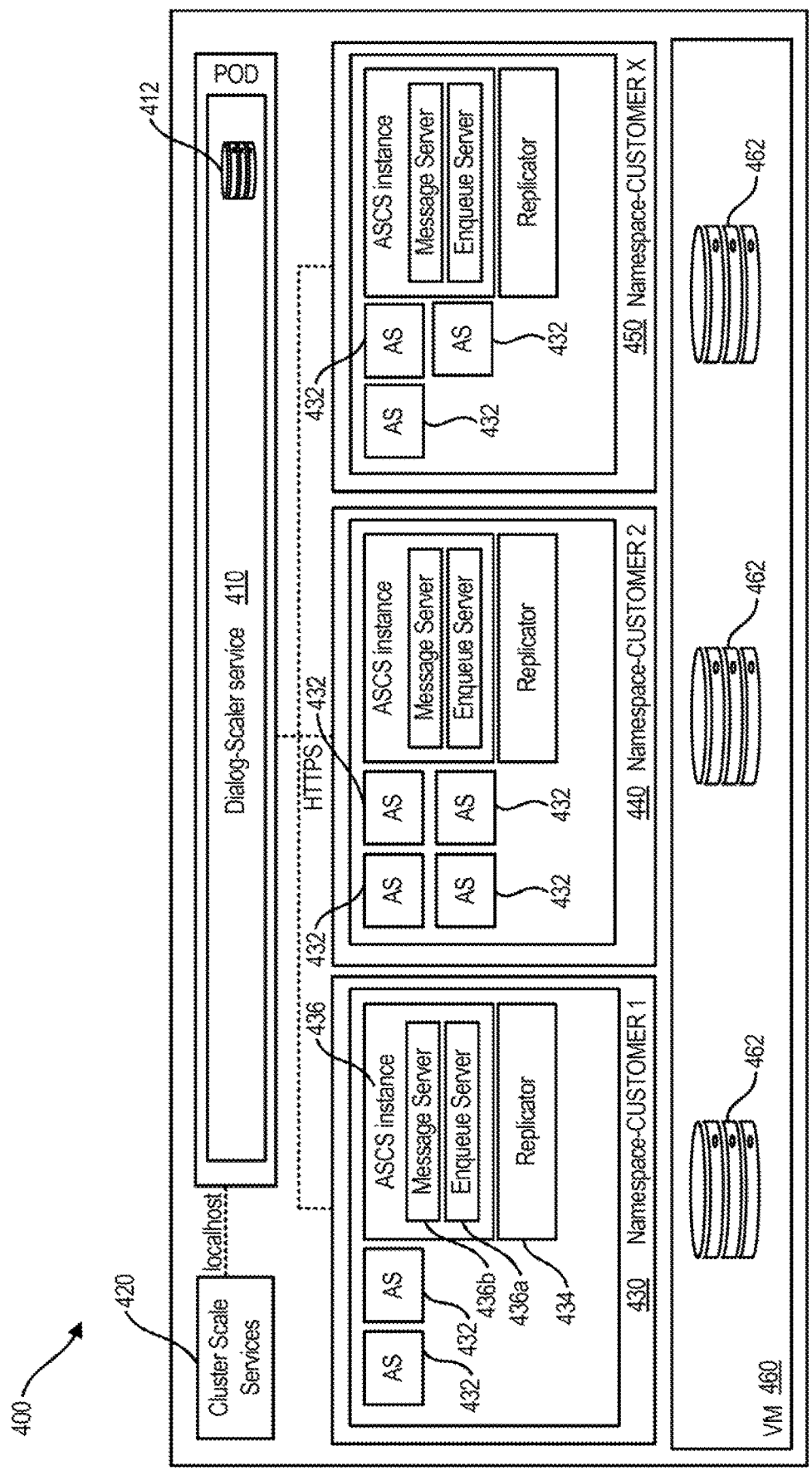
FIG. 4 illustrates an example infrastructure for dynamically allocating resources to support application tasks prior to execution of those tasks.

FIG. 4 illustrates an example infrastructure 400 for dynamically allocating resources to support application tasks prior to execution of those tasks. Infrastructure 400 includes a dialog-scaler service 410, cluster scale services 420, one or more namespaces 430, 440, 450, and a virtual machine (VM) 460. Each namespace 430, 440, 450 can run one or more applications (e.g., applications associated with particular customers). Tasks performed by an application require various computing resources for execution. These computing resources are provided by one or more application servers 432 within each namespace 430, 440, 450. The application servers 432 can perform a number of application tasks such as analyzing data, providing data to a user via a user interface, and/or facilitating the upload of data to and/or retrieval of data from one or more databases 462 of VM 460. VM 460 can have similar functionality and structures as described in detail in FIGS. 1-3. Application servers 432 are shared resources across the infrastructure 400 and are allocated to particular namespaces (e.g., namespaces 430, 440, 450) based on process loads (e.g., expected computing resource consumption) associated with application tasks before such tasks run. The process loads are provided by each namespace 430, 440, 450 to dialog-scaler service 410 for appropriate application server 432 allocation. For example, process information containing process loads can be communicated by each namespace 430 to dialog-scaler service 410 as data over a communication protocol such as Hypertext Transfer Protocol Secure (HTTPS), as explained in more detail in FIG. 5.

Dialog-scaler service 410 can monitor and evaluate process loads across all namespaces within the infrastructure 400 (e.g., namespaces 430, 440, 450). For example, dialog-scaler service 410 can receive instructions from one or more application services 432 relating to an activity to run. These instructions can be sent via an HTTP request. Based on these requests, together with the monitoring of the cluster, dialog-scaler service 410 can determine how many, if any, application services 432 need to be added or removed. Dialog-scaler service 410 can determine an appropriate number of application servers 432 to allocate to each namespace 430, 440, 450 based on the process loads for that application task. Dialog-scaler service 410 can also consider other resource allocation factors such as current availability of application servers or additional process tasks expected to run when the application task is also running. The number of application servers 432 allocated to each namespace 430, 440, 450 can be dependent on an anticipated process load at a given time. In other words, this dynamic allocation can occur prior to the execution of application tasks of a particular namespace 430, 440, 450. Such allocation proactively addresses process loads before they occur. The number of application servers 432 assigned to each namespace 430, 440, 450 can vary. For example, namespace 430 as illustrated in FIG. 4 has two application servers 432 allocated to address process loads associated with one or more applications of that namespace. Namespace 440, on the other hand, has four application servers 432 allocated and namespace 450 has three application servers 432 allocated. Once the number of appropriate application servers 432 is determined, dialog-scaler service 410 with the assistance of cluster scale services 420 allocates the appropriate number to that respective namespace. The communication between the dialog-scaler service 410 and the cluster scale services 420 can be local communications (e.g., localhost) with each other. Cluster scale services 420 deploys the appropriate number of application servers 432 as determined by dialog-scaler service 410. For example, if dialog-scaler service 410 determines that namespace 430 should have three application servers 432 to meet its process loads, cluster scale services 420 will allocate that appropriate number. Dialog-scaler service 410 analyzes how many application servers 432 are already allocated to namespace 430 (e.g. two) and ensure that one additional application server 432 is allocated to namespace 430. Dialog-scaler service 410 can also remove one or more application servers 432 from a namespace if it determines less application servers can meet the process loads. Dialog-scaler service 410 can also maintain a current number of application servers 432 if no additional applications servers need to be added or removed from a namespace to meet the appropriate number determined.

Dialog-scaler service 410, in some variations, can be encapsulated in a wrapper such as a POD. A POD can represent a unit of deployment. The POD can encapsulate one or more containers associated with an application, storage resources such as database 412, a unique network internet protocol (IP), and/or any other options relating to how the one or more containers operate. A POD, in other variations, can encapsulate an application having multiple co-located containers that are tightly coupled and share resources. These co-located containers can, in some cases, form a single cohesive unit of service. This unit can be managed as a single entity.

A database 412 can be encapsulated with the POD and used for storage of the process information. In cases where a namespace 430, 440, 450 has previously communicated process information associated with an application task, dialog-scaler service 410 can store such information into database 412. Rather than communicating with each namespace before the same application task is run, dialog-scaler service 410 can retrieve that information from database 412. Such retrieval can facilitate quick access of the process information locally, rather than receiving duplicative details from namespace 430, 440, 450. Additionally, database 412 can contain various business rules such as rules relating to budget, limit, history, and the like. These business rules can be used by dialog-scaler service 410 to determine how to appropriately scale the application servers 432 and associated limits. For example, if budget associated with a namespace may preclude adding an additional application servers 432.

Each namespace 430, 440, 450 can also include an application server central services (ASCS) instance 436 and replicator server 434. ASCS instance 436 is the central instance that can manage loads locally between the various application servers 432 within the same namespace (e.g., ASCS 436 within namespace 430 can manage the application servers 432 within namespace 430). The message server 436b can ensure communication between the application servers 432. The enqueue server 436a is a central lock server that stores object locks centrally. Enqueue server 436a can ensure that locks obtained within one application server 432 are visible across all other application servers 432 within the same namespace (e.g., all application servers 432 within namespace 430). For example, if a user is editing an object (e.g., an account or a marketing campaign) from a one application server instance, this object should be locked to avoid someone else editing it at the same time from another application server instance. Replicator server 434 provides back-up processing functionality for each namespace 430, 440, 450. If the ASCS instance 436 is in the process of failing or fails, replicator server 434 can temporarily handle communications between namespace 430 and dialog-scaler service 410.

Figure 5:
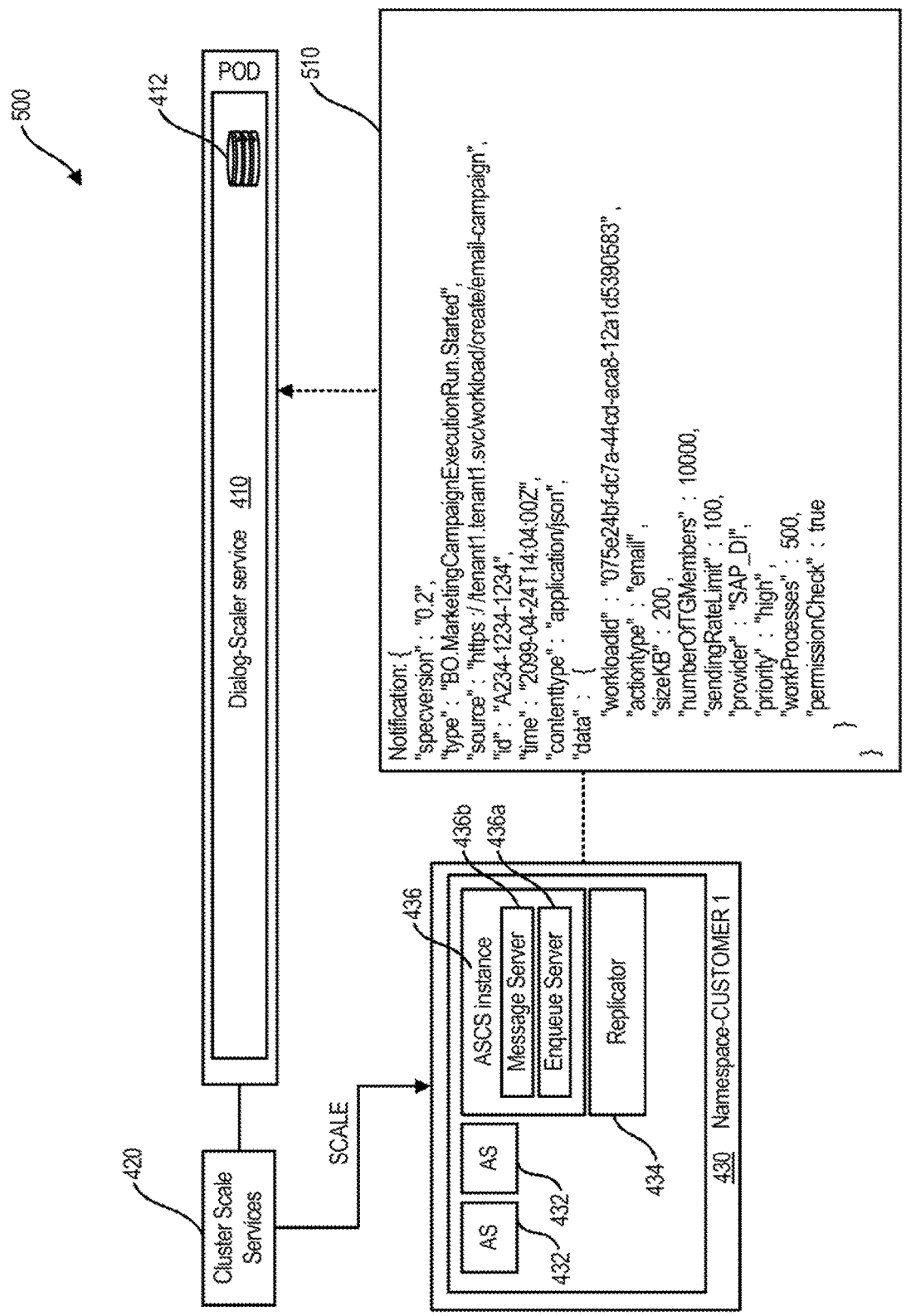
FIG. 5 illustrates example communication flow between dialog-scaler service, cluster scale service, and namespace.

FIG. 5 illustrates example communication flow 500 between dialog-scaler service 410, cluster scale service 420, and namespace 430. By way of example and for ease of understanding, a single namespace is illustrated but it can be appreciated that any number of namespaces can communicate similarly. Using communication flow 500, applications within namespace 430 can provide specific process information to dialog-scaler service 410 that defines what kind for workload the application is about to run on the allocated application servers 432. For example, the process information can include work processes that define a number of process threads capable of being executed in parallel, a type of work to be executed, a memory size associated with executing application processes, and/or a priority level associated with the application. The process information can be determined by the namespace 430. For example, the namespace 430 can evaluate process threads associated with executing a particular application task. The namespace 430 can then determine process loads associated with the process threads. A notification 510 can be generated by the namespace 430 that contains the process information. Notification 510 can be formatted, in some variations, as a JavaScript Object Notation (JSON) event.

By way of example, consider an application task of a marketing campaign. As part of the marketing campaign, customer 1 intends to use namespace 430 to send approximately 200,000 emails on a specific date and at a specific time. Before executing the application task (e.g., sending the emails), the namespace determines how many work processes (e.g., process threads that can be executed in parallel) are associated with sending the emails. Namespace 430 generates a notification 510 including this process information. The notification 510 is sent to dialog-scaler service 410. Dialog-scaler service 410 receives notification 510, interprets it, and calculates how many application servers 432 will meet the process loads detailed in the notification 510. Additionally, dialog-scaler service 410 determines the allocation by evaluating what processes are currently running along with what processes would be running together with the email application task at its planned execution time. Based on the determined number of application servers 432, the dialog-scaler service 410 determines how much, if any, resources (e.g., application servers 432) should be scaled up or down. In other words, dialog-scaler service 410 determines a delta between the application servers 432 currently allocated to the namespace. Based on this delta, dialog-scaler service 410 can communicate that cluster scale services 420 add one or more additional application servers 432 to namespace 430, remove one or more application servers 432 from namespace 430, or maintain the current allocation of application servers 432 within namespace 410. Cluster scale services 420 then allocates such servers appropriately. This allocation occurs before the planned application task executes (e.g., before the emails are sent) to ensure that the infrastructure 300 operates smoothly with minimal to no time delays. As previously noted, this marketing application task is merely an example. It can be appreciated that other applications and/or tasks, such as uploading data, running complex calculation programs, product recommendations, machine learning, prediction analysis, etc. can utilize the infrastructure described herein.

Figure 6:
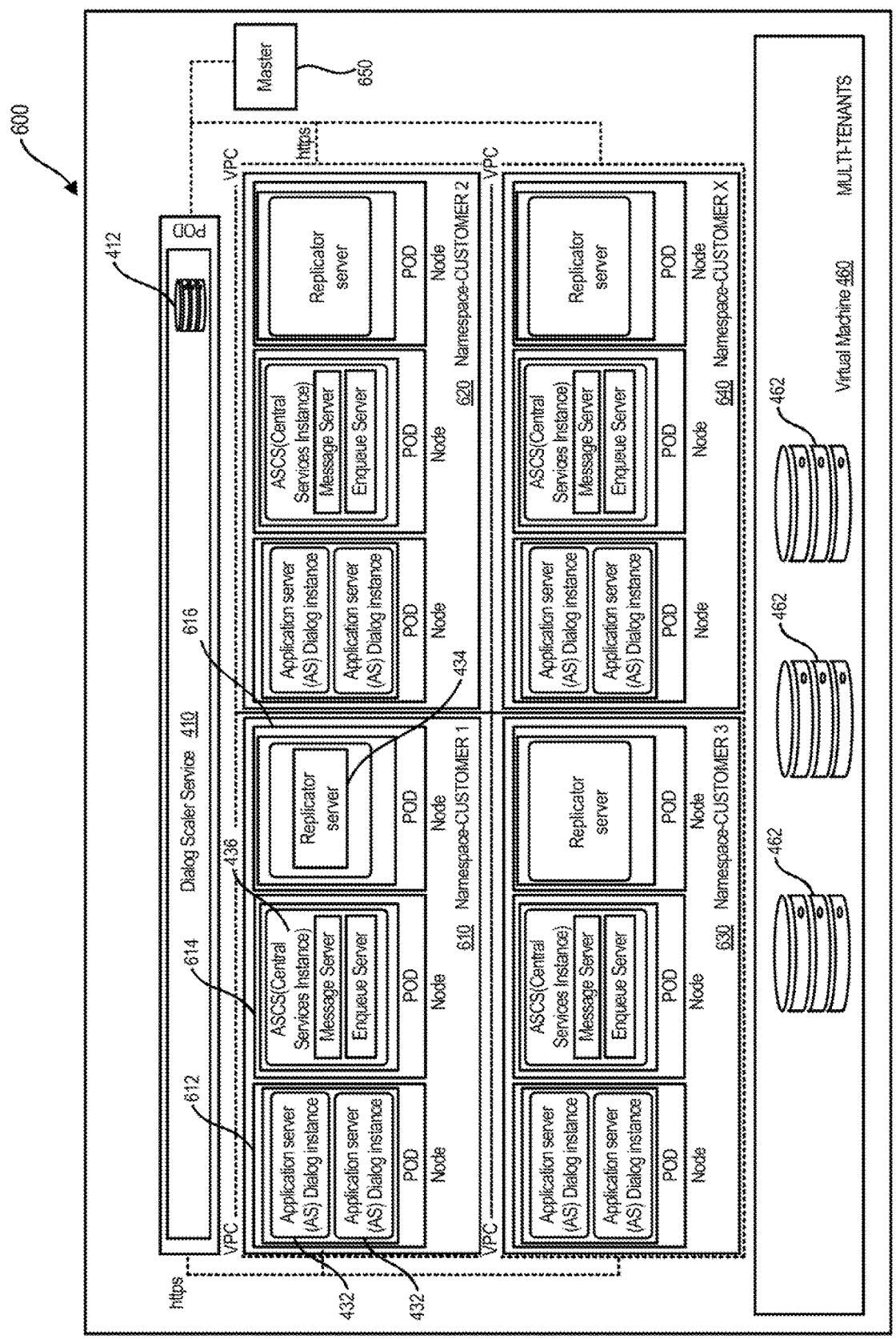
FIG. 6 illustrates another example infrastructure for dynamically allocating resources to support application tasks prior to execution of those tasks.

FIG. 6 illustrates another example infrastructure 600 for dynamically allocating resources to support application tasks prior to execution of those tasks. Infrastructure 600 contains similar components and functionality as described in FIG. 4. In addition, infrastructure 600 includes a master watchdog 650 that monitors the functionality of each namespace 610, 620, 630, 640 and facilitates transitioning to one or more backup servers. Each namespace 610, 620, 630, 630 is a virtual private cloud (VPC) containing a series of nodes. For example, namespace 610 is a VPC having POD 612 containing application servers 432, POD 614 containing ASCS instance 436, and POD 616 containing replication server 434. Each POD 612, 614, 616 is treated as a node within the respective namespace. Although two application servers 432 are illustrated in each namespace 610, 620, 630, 640, any number of application servers can be allocated as described herein.

Figure 7:
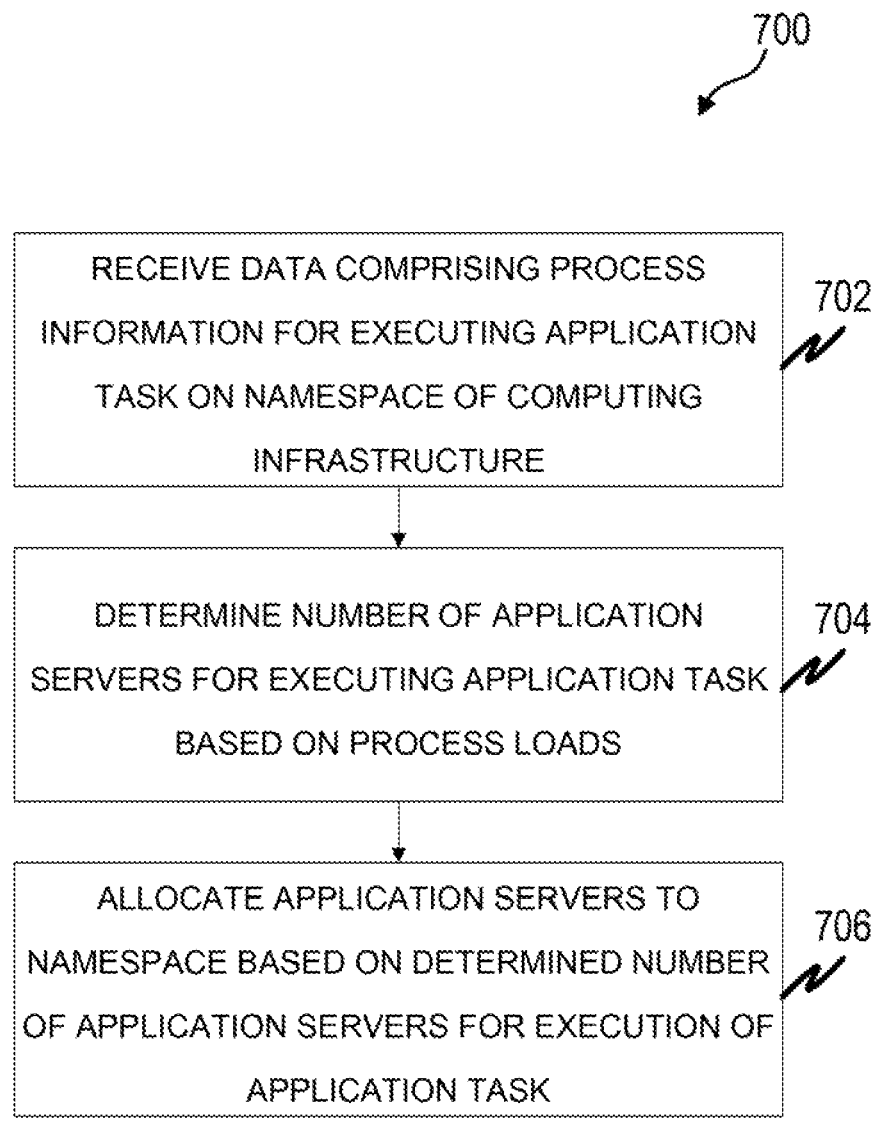
FIG. 7 illustrates an example process flow diagram for proactively allocating resources of a computing infrastructure having a plurality of namespaces.

FIG. 7 illustrates an example process flow diagram 700 for proactively allocating resources of a computing infrastructure having a plurality of namespaces. Data having process information for executing an application task on a namespace of the computing infrastructure is received, at 702. The process information defines process loads associated with the application task. A number of application servers for executing the application task based on the process loads is determined, at 704. Application servers are allocated, at 706, to the namespace based on the determined number of application servers for execution of the application task. Each step 702, 704, and 706 occur prior to execution of the application task.

Figure 8:
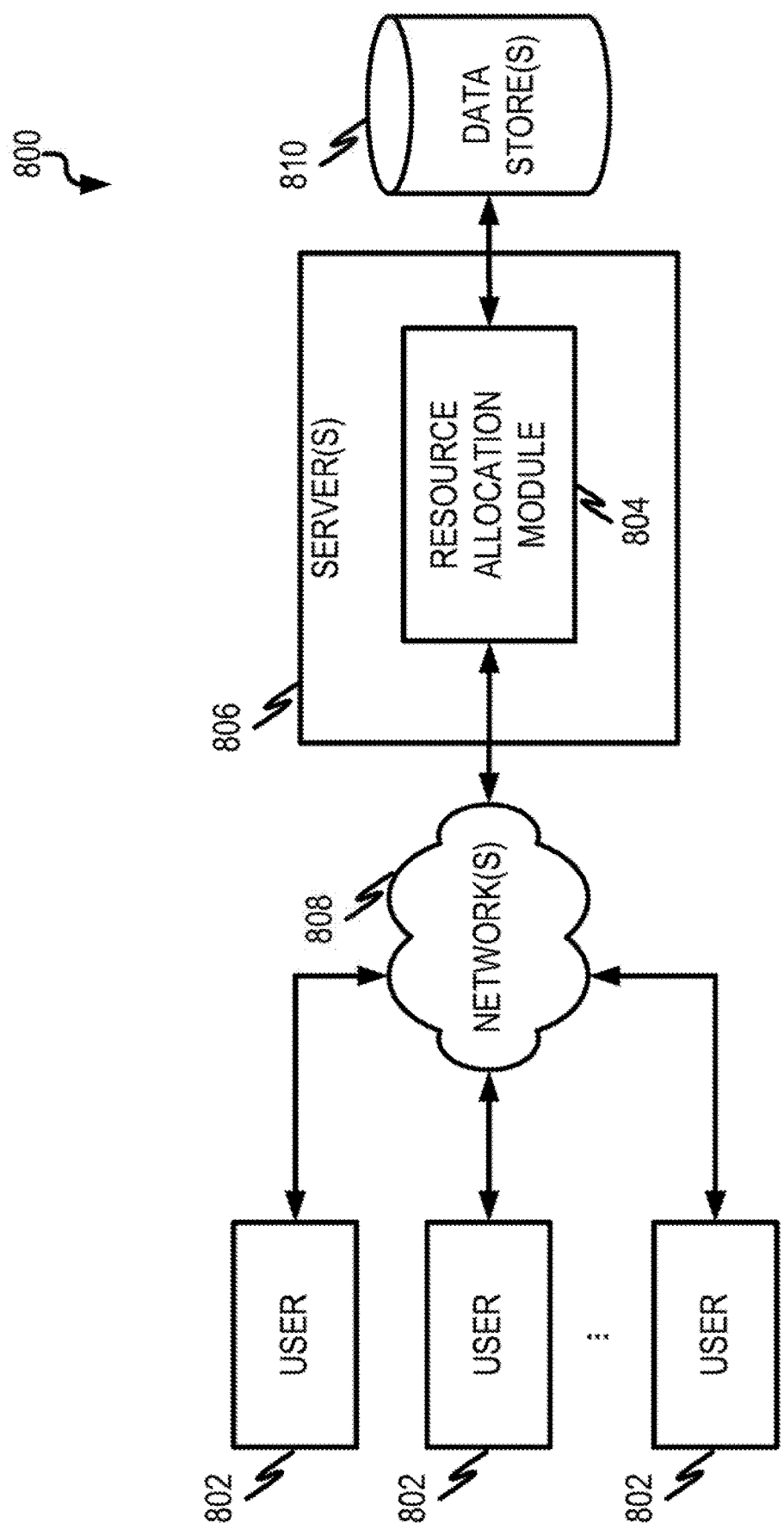
FIG. 8 illustrates an example computer-implemented environment for implementing various aspects described herein.

FIG. 8 illustrates an example computer-implemented environment 800 wherein users 802 can interact with server 806 having resource allocation module 804 for allocating resources as described herein, hosted on one or more servers 806 through a network 808.

As shown in FIG. 8, the users 802 can interact with the resource allocation module 804 through a number of ways, such as over one or more networks 808. One or more servers 806 accessible through the network(s) 808 can host the resource allocation module 804. The one or more servers 806 can also contain or have access to one or more data stores 810 for storing data for the resource allocation module 804.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 9:
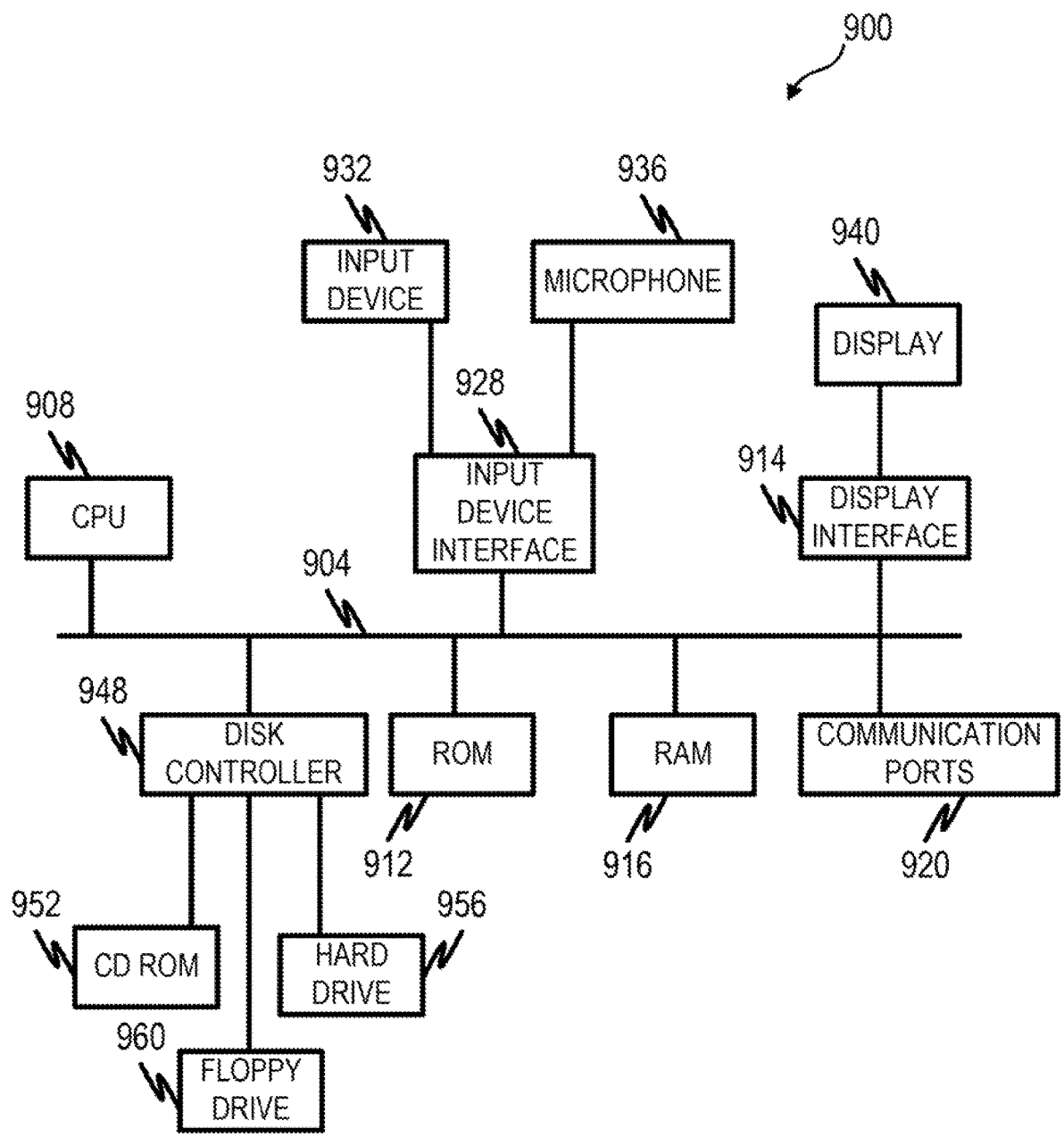
FIG. 9 is a diagram illustrating a sample computing device architecture for implementing various aspects described herein.

FIG. 9 is a diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives can be external or internal floppy disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 to the user and an input device 932 such as keyboard and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone 936, or tactile feedback); and input from the user can be received in any form, including acoustic, speech, or tactile input. In the input device 932 and the microphone 936 can be coupled to and convey information via the bus 904 by way of an input device interface 928. Other computing devices, such as dedicated servers, can omit one or more of the display 940 and display interface 914, the input device 932, the microphone 936, and input device interface 928.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of proactively and dynamically allocating resources of a computing infrastructure, the computing infrastructure having a plurality of namespaces implemented by one or more data processors forming part of at least one computing device in the computing infrastructure, the method comprising:

receiving, by a first service of the computing infrastructure, a notification from a namespace of the computing infrastructure comprising process information for a planned execution of an application task on the namespace and a planned execution time, the process information comprising process loads associated with executing process threads in the application task, work processes defining a number of process threads capable of being executed in parallel in the application task, a type of work to be executed by the application task, a memory size associated with executing the application task, and a priority level associated with the application task;

before the planned execution time, determining, by the first service, a number of application servers for executing the application task based on the process information;

before the planned execution time, allocating, by a second service different than the first service of the computing infrastructure and in response to the determining by the first service, application servers to the namespace, the allocating comprising adding or removing one or more application servers from the namespace based on a difference between the determined number of application servers for execution of the application task and a number of application servers previously allocated to the namespace; and executing the application task on the allocated application servers of the namespace during the planned execution time.

2. The method of claim 1, wherein the notification is in a JavaScript Object Notation (JSON) format.

3. The method of claim 1, further comprising:
monitoring a system load across the plurality of namespaces, wherein the number of application servers allocated to the namespace is further based on the system load.

4. The method of claim 1, wherein the process loads are determined based on a current availability of application servers in the namespace and additional application tasks expected to be executing when the application task on the namespace is executed.

5. A system of proactively and dynamically allocating resources of a computing infrastructure, the computing infrastructure having a plurality of namespaces implemented by one or more data processors forming part of at least one computing device in the computing infrastructure, the system comprising:

one or more data processors; and
memory storing instructions stored on the one or more data processors, which when executed result in operations comprising:
receiving, by a first service of the computing infrastructure, a notification from a namespace of the computing infrastructure comprising process information for a planned execution of an application task on the namespace and a planned execution time, the process information comprising process loads associated with executing process threads in the application task, work processes defining a number of process threads capable of being executed in parallel in the application task, a type of work to be executed by the application task, a memory size associated with executing the application task, and a priority level associated with the application task;

before the planned execution time, determining, by the first service, a number of application servers for executing the application task based on the process information;

before the planned execution time, allocating, by a second service different than the first service of the computing infrastructure and in response to the determining by the first service, application servers to the namespace, the allocating comprising adding or removing one or more application servers from the namespace based on a difference between the determined number of application servers for execution of the application task and a number of application servers previously allocated to the namespace; and executing the application task on the allocated application servers of the namespace during the planned execution time.

6. The system of claim 5, wherein the notification is in a JavaScript Object Notation (JSON) format.

7. The system of claim 5, wherein the operations further comprise monitoring a system load across the plurality of namespaces, wherein the number of application servers allocated to the namespace is further based on the system load.

8. The system of claim 5, wherein the process loads are determined based on a current availability of application servers in the namespace and additional application tasks expected to be executing when the application task on the namespace is executed.

9. A non-transitory computer program product storing instructions which, when executed by one or more data processors forming part of at least one computing device in a computing infrastructure having a plurality of namespaces, result in operations comprising:

receiving, by a first service of the computing infrastructure, a notification from a namespace of the computing infrastructure comprising process information for a planned execution of an application task on the namespace and a planned execution time, the process information comprising process loads associated with executing process threads in the application task, work processes defining a number of process threads capable of being executed in parallel in the application task, a type of work to be executed by the application task, a memory size associated with executing the application task, and a priority level associated with the application task;

before the planned execution time, determining, by the first service, a number of application servers for executing the application task based on the process information;

before the planned execution time, allocating, by a second service different than the first service of the computing infrastructure and in response to the determining by the first service, application servers to the namespace, the allocating comprising adding or removing one or more application servers from the namespace based on a difference between the determined number of application servers for execution of the application task and a number of application servers previously allocated to the namespace; and executing the application task on the allocated application servers of the namespace during the planned execution time.

10. The non-transitory computer program product of claim 9, wherein the notification is in a JavaScript Object Notation (JSON) format.

11. The non-transitory computer program product of claim 9, wherein the operations further comprise:

monitoring a system load across the plurality of namespaces, wherein the number of application servers allocated to the namespace is further based on the system load.

12. The non-transitory computer program product of claim 9, wherein the process loads are determined based on a current availability of application servers in the namespace and additional application tasks expected to be executing when the application task on the namespace is executed.

* * * * *